Figure 1:
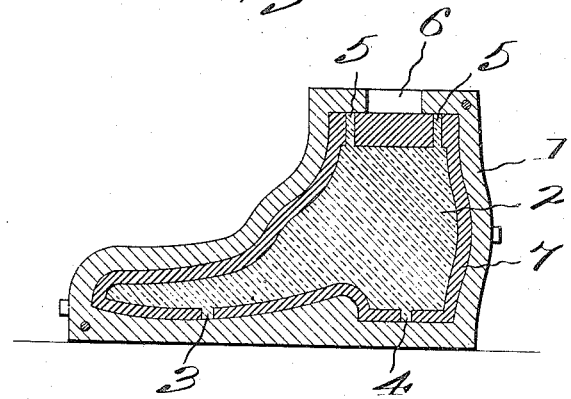

W. K. FREEMAN.
COMPOSITION LAST AND PROCESS OF MAKING SAME.
APPLICATION FILED NOV. 7, 1914.

1,175,428.  
Patented Mar. 14, 1916.

Witnesses  
Edwin J. Beller  
F. Ennis Mattern

Inventor  
Walter K. Freeman,  
by Chas. C. Stauffer  
Attorney.

UNITED STATES PATENT OFFICE.

WALTER K. FREEMAN, OF OSCAWANA, NEW YORK, ASSIGNOR TO HYDROLOSE PROCESS CORPORATION, A CORPORATION OF NEW YORK.

COMPOSITION LAST AND PROCESS OF MAKING SAME.

1,175,428.   Specification of Letters Patent.   Patented Mar. 14, 1916.

Application filed November 7, 1914. Serial No. 870,880.

*To all whom it may concern:*

Be it known that I, WALTER K. FREEMAN, a citizen of the United States, residing at Oscawana, in the county of Westchester and State of New York, have invented certain new and useful Improvements in Composition Lasts and Processes of Making Same; and I do hereby declare the following to be a full, clear, and exact description of the invention, such as will enable others skilled in the art to make and use the same.

My invention relates to composition lasts and the method of making the same, and the object of the invention is to produce a last which is superior to the wood or metal lasts now used, and which can be more readily made and at less cost.

A further object of the invention is to produce a last especially adapted for use in vulcanizing rubber foot wear, and to this end, in making the lasts, I utilize the wood derivatives recovered from the sulfite waste liquor of wood pulp mills.

In vulcanizing rubber foot wear, considerable trouble is experienced with wood lasts on account of the warping properties of the wood and its liability to absorb moisture, and trouble is likewise experienced in the use of metal lasts due to the expansion of the metal in the vulcanizing process. In vulcanizing rubber goods, the rubber is coated on a fabric over the lasts or other forms, which are then mounted on frames and placed in the vulcanizing chamber. On account of the heat to which the lasts are subjected in this chamber, a certain percentage of the rubbers are rendered defective, due to the warping of the wood lasts and the expansion of the metal lasts, causing blisters or loosening of the rubber from the fabric, or the separation of the rubber at a seam, etc. And it is therefore desirable to provide a last which will not be affected by moisture or the increase in temperature within the limits of this process.

Lasts made in accordance with my invention are light in weight, fire- and moisture-proof within the limits of the vulcanizing treatment, and will not warp or expand during the treatment. The use of such a last therefore greatly reduces the percentage of defective rubber articles resulting from the vulcanizing process.

In my co-pending application, Serial Number 803,044, filed November 25, 1913, I have described a method of recovering from the sulfite waste liquor of wood pulp mills, the wood derivatives and also the sulfurous acid and calcium constituents in the form of substantially neutral inert substances, and I have used the word "xylium" to designate broadly the substantially neutralized inert recovered product whether in a syrupy or anhydrous state.

It was pointed out in that application that if the wood derivatives were to be recovered and separated from the sulfurous acid and calcium constituents of the liquor, the liquor was first treated with a chlorid or with a coagulating agent and then treated with a suitable precipitant as barium chlorid to effect precipitation of the sulfur compounds of the liquor, after which the syrupy mass containing the wood derivatives of the liquor was drawn off from the precipitate and then bleached if desired, and evaporated down to an anhydrous mass and ground into powder. I termed this recovered substance containing the wood derivatives separated from the precipitates, whether in the syrupy or powdered state, "xylozo." It was also pointed out that if the wood derivatives and treated sulfurous acid and calcium ingredients were to be separated from the liquid part or "xylozo" as a separate product or precipitate, I applied to this product or precipitate the term "xylosca."

In this specification, I will use the terms "xylium," "xylosca" and "xylozo" in the sense stated, to designate the neutralized products recovered from the sulfite waste liquor. "Xylium," therefore, is a general expression, since it means the compound which contains both the potential derivatives "xylozo" and "xylosca." I may substitute for the complete "xylium", in whole or in part, either "xylozo" or "xylosca", the former having a tendency to increase resiliency and the latter to increase toughness in the product, and I wish the term "xylium" to include modifications as indicated.

In order that those skilled in the art may thoroughly understand my invention and the method of carrying out the same, I will describe in detail what I believe to be the best method now known to me of making my new composition last. I first take suitable finely disintegrated inactive matter, preferably dry disintegrated wood or other finely divided fibrous material, and treat it with a suitable oxy-chlorid to effect induration. This is preferably done by wetting the disintegrated matter with a solution of a metal chlorid such as magnesium chlorid of a suitable strength, say 15° Baumé, and then mixing the coated material with a suitable powdered metal oxid such as magnesium oxid sufficient to thoroughly coat the minute particles of wood, and then permitting the mixture to dry out to effect thorough induration of the mass. I then thoroughly mix together as by grinding a suitable quantity of disintegrated "xylium" and a suitable dry metallic oxid and chlorid such as magnesium oxid and chlorid, and to the resulting powder I mix a suitable quantity of the finely disintegrated indurated wood or other inert matter. This mixture is then wetted with water or a weak solution of a suitable metal chlorid to reduce it to a stiff plastic mass in which form it may be pressed into suitable molds to form hollow or solid lasts as desired.

I have found in practice that the proportion of the different ingredients may be considerably varied according to the quality of the last desired, but a very satisfactory last has been made from a mixture containing the following proportion of ingredients: Approximately 50 parts by weight of dry "xylium," approximately 50 parts by weight of magnesium oxid, approximately 25 parts by weight of magnesium chlorid, and approximately 45 parts by weight of finely disintegrated wood which is treated with magnesium oxy-chlorid to indurate it.

After this disclosure of my invention it will be obvious to those skilled in the art that certain changes and substitutions may be made in carrying out my invention without departing from the spirit thereof. For instance, the finely disintegrated indurated wood may be ground up together with the other ingredients, or the different ingredients may be mixed in separately to form the powdered mixture and if desired the metallic chlorid may be added in the form of solution of suitable strength to insure the proper amount of the chlorid to effect with the oxid the bonding action, and likewise if desired any suitable metallic oxy-chlorid such as zinc, barium or aluminum oxy-chlorid, or any suitable compound oxy-chlorid may be used in place of a magnesium oxy-chlorid.

Figure 2:
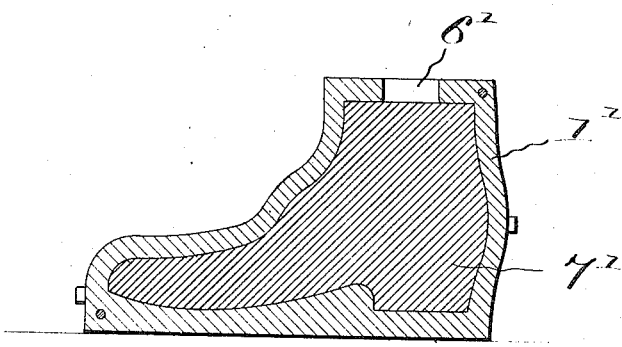

Figures 1 and 2 are respectively longitudinal sections showing the hollow and solid lasts in the molds.

In Fig. 1, 1 is a suitable metal mold in which has been placed a paraffin form or core 2, having projecting pegs 3 and 4 to properly support it within the mold, leaving a space between the core and the metal mold depending upon the thickness of the desired last. This paraffin core also has two upper projections 5, the purpose of which is to form two holes in the upper part of the hollow last through which pins may be forced to hold the last in place on suitable racks during the vulcanizing process. The plastic mixture is pressed into the mold through the opening 6 in any suitable way such as by compressed air, and after the mixture is thoroughly packed around the space between the core and the mold and allowed to stand until chemical action has set in and the form hardened sufficiently to retain its shape, it may be removed from the mold and further dried, and the paraffin core melted out through the openings formed by the pegs 3, 4 and 5. If it is desired to form a solid last the plastic mixture is forced through the opening 6', as above described in connection with Fig. 1, under pressure sufficient to insure the complete filling of the mold and the elimination of any possible air bubbles, after which the last may be allowed to partially dry and then removed from the mold.

Having thus described my invention, what I claim as new and desire to secure by Letters Patent, is:

1. A composition last containing a substantial amount of "xylium" and a bond of oxy-chlorid cement.

2. A composition last containing a substantial amount of "xylium," disintegrated hard vegetable matter, and a bond of oxy-chlorid cement.

3. A composition last containing a substantial amount of "xylium," finely disintegrated indurated matter and a bond of oxy-chlorid cement.

4. A composition last containing a substantial amount of intimately mixed powdered "xylium" and suitable finely disintegrated fibrous material held together by a suitable bond of oxy-chlorid cement.

5. A composition last containing a substantial amount of hardened "xylium" intimately mixed with disintegrated indurated hard vegetable matter, compounded with and held together by a bond of oxy-chlorid cement.

6. A composition last containing a substantial amount of powdered "xylium," dry disintegrated wood and a bond of oxy-chlorid cement.

7. A composition last containing, intimately mixed, a substantial amount of powdered "xylium" and finely disintegrated indurated wood held together by a suitable bond of oxy-chlorid cement.

8. A composition last containing, intimately mixed, a substantial amount of

"xylium" derivatives, disintegrated indurated fibrous material, and a small amount of inert material.

9. The method of making a composition last which consists in intimately mixing "xylium" finely disintegrated fibrous material, and a suitable oxy-chlorid, forcing the mixture in a mold under pressure while in a stiff plastic state, and allowing it to dry.

10. The method of making a composition last or similar article, which consists in treating disintegrated wood with a suitable oxy-chlorid to indurate the same, finely disintegrating said indurated product, and intimately mixing it with powdered "xylium" and a suitable oxy-chlorid bond, reducing the mixture to a stiff plastic consistency, and forcing it under pressure into a suitable mold and allowing it to dry.

In testimony whereof I affix my signature in the presence of two subscribing witnesses

WALTER K. FREEMAN.

Witnesses:
   JNO. S. GEORGE,
   CLARENCE W. HODGE.

Copies of this patent may be obtained for five cents each, by addressing the "Commissioner of Patents, Washington, D. C."